(12) United States Patent
Mazhar

(10) Patent No.: US 6,702,050 B1
(45) Date of Patent: Mar. 9, 2004

(54) ROBOTIC VEHICLE CONSTRUCTION

(75) Inventor: Mohammad S. Mazhar, Sterling Heights, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 19 days.

(21) Appl. No.: 10/252,914

(22) Filed: Sep. 23, 2002

(51) Int. Cl.$^7$ ............................................. B62D 55/04
(52) U.S. Cl. ........................................... 180/10; 280/78
(58) Field of Search ................................ 280/206, 207, 280/78; 180/10, 7.1, 9.1; 244/158 R, 164, 169, 765, 52; 901/1

(56) References Cited

U.S. PATENT DOCUMENTS

| | | | | |
|---|---|---|---|---|
| 3,237,885 A | * | 3/1966 | Mohar | 244/162 |
| 3,746,117 A | * | 7/1973 | Alred | 180/21 |
| 3,777,835 A | * | 12/1973 | Bourne | 180/10 |
| 4,096,919 A | * | 6/1978 | Thompson | 180/180 |
| 4,102,542 A | * | 7/1978 | Pirre, Jr. et al. | 280/207 |
| 6,298,934 B1 | * | 10/2001 | Shteingold | 180/10 |
| 6,499,696 B1 | * | 12/2002 | Malinowski | 244/158 R |

* cited by examiner

Primary Examiner—Lesliey Morris
Assistant Examiner—Tony Winner
(74) Attorney, Agent, or Firm—David L. Kuhn; Gail S. Soderling; Clifford C. Carter

(57) ABSTRACT

A robotic vehicle is provided with an elliptical shaped housing, the housing having a circumferential track disposed about its midsection. The circumferential track is driven by a prime mover to rotate the housing and move it over a variety of different terrains. The vehicle is adapted to carry weapons systems for military application.

1 Claim, 2 Drawing Sheets

ROBOTIC VEHICLE CONSTRUCTION

GOVERNMENT INTEREST

The invention described here may be made, used and licensed by the United States Government for governmental purposes without paying me any royalty.

BACKGROUND OF THE INVENTION

Robotic vehicles are becoming more prevalent in a wide variety of situations where it is desirable to minimize the exposure of humans to dangerous conditions. Commercial environments include hazardous chemical materials and nuclear materials where exposure by humans must be avoided. The military desires to use robotic devices as a means of probing into surrounding territory for the purposes of reconnaissance and force projection without the need to expose its valuable and highly trained troops. Thus, a military robotic vehicle might be equipped with sensors for identifying hostile forces, measuring terrain variables and deploying obstacles. A military robot may also carry one or more forms of munitions to protect the robot and to remove obstacles encountered by the robot.

One important characteristic for robotic vehicles used in military applications is the ability to operate in soft soils. A second important aspect is stability of the vehicle as it traverses uneven terrain. Yet another aspect is the quality of traction provided by the drive units of the vehicle. The drive units used must have limited skid or slip when driving the vehicle even in soft soil or uneven terrain.

At present, many robotic structures are modeled on multiple wheeled structures such as small cars. Such vehicles have problems with soft soil conditions where the wheels tend to become mired and the vehicle will become disabled due to the high pounds per square inch tire footprint. Also, such multi wheeled vehicles require a complex steering and control system making fabrication difficult and expensive. A multi wheeled structure also results in a high center of gravity when the vehicle is carrying weapons or sensors above the vehicle.

A second type of robotic vehicle is designed with various combinations of multi-legged structures to form a spider configuration. Spider configurations can move over small obstacles; however, such devices require complex control technology and are very slow moving since each leg must be moved individually. Such structures have a high center of gravity and are not well adapted to carry a load. Multi-tracked devices have also been proposed. Track laying devices also require complex control systems and the vehicle's ability to maneuver is dependent on chassis width of the vehicle and the length of the track.

SUMMARY OF THE INVENTION

It is an object of this invention to provide a robotic vehicle, which has a relatively low center of gravity even when carrying weapons, and or sensing devices. It is a further object of this invention to provide a robotic vehicle with good traction over a variety of various terrains. Further, it is an object of this invention that the robotic vehicle be able to maneuver in a relatively small area so as to provide sensing and targeting direction without substantial vehicle movement.

These and other objects are accomplished by a robotic according to this invention. The robotic vehicle has an elliptical shaped housing with major and minor axes, the elliptical housing having its major axis substantially parallel to the terrain the vehicle is traversing. The elliptical housing has a continuous circumferential track disposed about its midsection coaxial with the major axis of the elliptical housing. The circumferential track has a ground gripping texture on its outer surface to ensure good traction for the robotic vehicle over an extremely wide variety of soil and terrain conditions.

The robotic vehicle of this invention has an axle mounted along the elliptical housing major axis. The axle is journaled with the housing to allow the housing and axle to rotate freely with respect to one another during operation as is described in detail below. The axle serves as a principal means of support for vehicle systems and serves to consolidate the various parts of the robotic structure. Many of the parts of the vehicle will be attached to the axle and use it to function together.

The robotic vehicle has a prime mover mounted within the elliptical housing to provide power to rotate the elliptical housing about the major axis and also provide the power to operate other functions attached to the vehicle. The prime mover is suspended from the axle and depends downward from the axle towards the ground to a position below the axle and near the ground. Placing the prime mover low in the housing results in a lowered center of gravity for the entire housing and thereby the vehicle.

The prime mover is engaged with a transmission that transmits power to the system. The transmission comprises a first drive gear connected to the prime mover the first gear in turn engaging a second, larger internally toothed gear, the two gears forming an internal spur gear drive combination. The larger gear of the power transmission is engaged with the continuous circumferential track so that as the large gear rotates, the circumferential track will rotate about the axle of the housing.

In addition to the prime mover-power transmission-circumferential track drive mechanism, the robotic system of this invention has a compressed gas steering system located within the elliptical housing. The compressed gas steering system includes a compressor that draws power from the prime mover and delivers ambient air under pressure to a gas storage tank for storage and later use. Sensing means will activate the compressor to maintain the desired pressure in the gas storage tank. A gas delivery system is connected to the gas storage tank for the delivery system having gas lines fluidly connected to the storage tank, with control valves as part of the delivery system. The delivery system provides compressed air to the rest of the system as needed. The compressed air system has jet nozzles located on each end of the axle; the jets have control means to change their orientation to provide additional steering and maneuverability. The control valves in the gas delivery system provide the required amounts of compressed air to the jets when it is desired to effect a rapid or tight radius turn.

Braking members are provided which can apply a braking force to the axle to promote turning, control speed, and hold the robot in position for firing of its weapons. The brakes can also be used to hold the robot in a fixed position for reconnaissance and use as a remote sensing station.

The second major portion of the overall robotic weapons system of this invention is a platform adapted to carry weapons and/or other functional units such as sensors, and communication units. The platform containing the desired items is supported by and journaled on the axle of the housing. The platform has a load-carrying surface located above the elliptical housing with respect to the surface on which the housing is located. The load-carrying surface is used to support the various mission critical gear that is needed to determine the terrain and locate possible military targets within the range of the robot. The load-carrying surface may also carry a radio antenna, and receiving devices for global positioning systems and other electronic equipment.

The weapons portion of the present system of this invention includes weapons pods mounted on the ends of the axle. The weapons pods will have a positioning motor that can rotate the weapons pod about the axle to the desired angle of elevation for firing.

Counterweight shells are attached to the axle opposite the weapons platform. The counterweight shells are adapted to carry a portion of the electronic systems, which will conserve volume and provide additional weight to the compounds. The shells will also contains a quantity of liquid to provide an adjustable component to the ballast for the weapons system.

The robotic vehicle has a liquid control system, which includes a pump, fluid lines and valves. The liquid control system fluidly connects the counterweight shells and is responsive to signals from the vehicle control means to move liquid between the counterweights. This will change the balance of the elliptical housing with respect to the circumferential tread in order to effect the robot's direction of travel.

DETAILED DESCRIPTION

Figure 1:
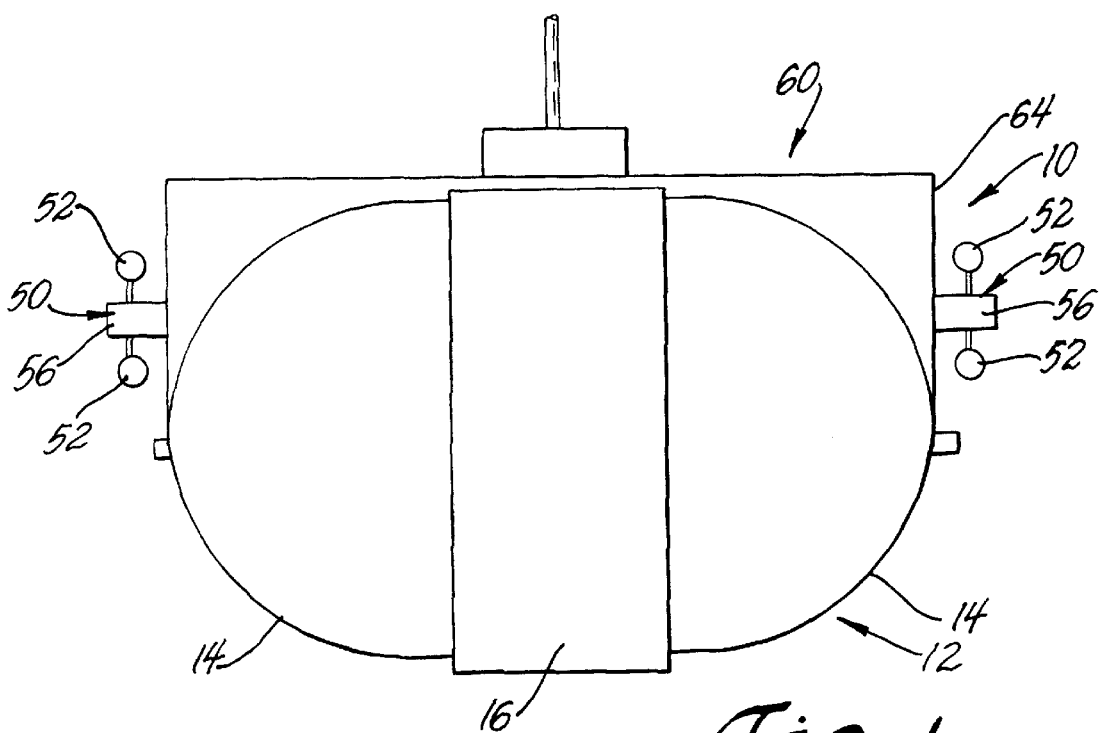
FIG. 1 is a schematic front view of one embodiment of this invention.

Referring to the accompanying drawing wherein like numerals refer to like parts, a robotic weapons system is designated generally 10 and has an elliptical housing 12 formed by two symmetrical domes 14. The resulting elliptical housing 12 has major and minor axes, the elliptical housing being deployed and powered, as described below, so as to rotate about the major axis. A circumferential track 16 is disposed coaxially with the major axis between the domes 14 about the midsection of the elliptical housing 12. The circumferential track 16 is formed with a ground gripping texture on its outer surface to provide good traction for the robotic system over a wide variety of ground and terrain conditions.

The robotic weapons system 10 has an axle 18 located coaxially with the major axis of elliptical housing 12. The axle 18 is journaled in an aperture in the domes 14 using bearings 20 at the ends of the axle that allow the housing 12 and axle to rotate freely with respect to each other. Them axle 18 can be thought of as the spine of the weapons system 10 to which components are connected and through which the components can communicate. The axle 18 is formed as a hollow tubular structure with an interior cavity through which various portions of the system can communicate as described in detail below.

A prime mover designated generally 22 provides the power for movement of the elliptical housing 12 and also for operation of the other system functions. The prime mover 22 is mounted within the elliptical housing 12 by being suspended from the axle 18, the prime mover being near the ground. This creates a lowered center of gravity for increased stability. The prime mover 22 could be a hydrocarbon burning type structure in which case the prime mover accessory equipment would contain a small engine, fuel tank, fuel control and radiator. However, where desired the prime mover 22 could be an electrical drive system with an associated electric motor, battery pack and electrical controls. In the future it is contemplated that the prime mover 22 could utilize fuel cell technology to provide a quiet exhaust free power source or even advanced solar panel structures in combination with a battery as part of the electric motor drive.

Figure 4:
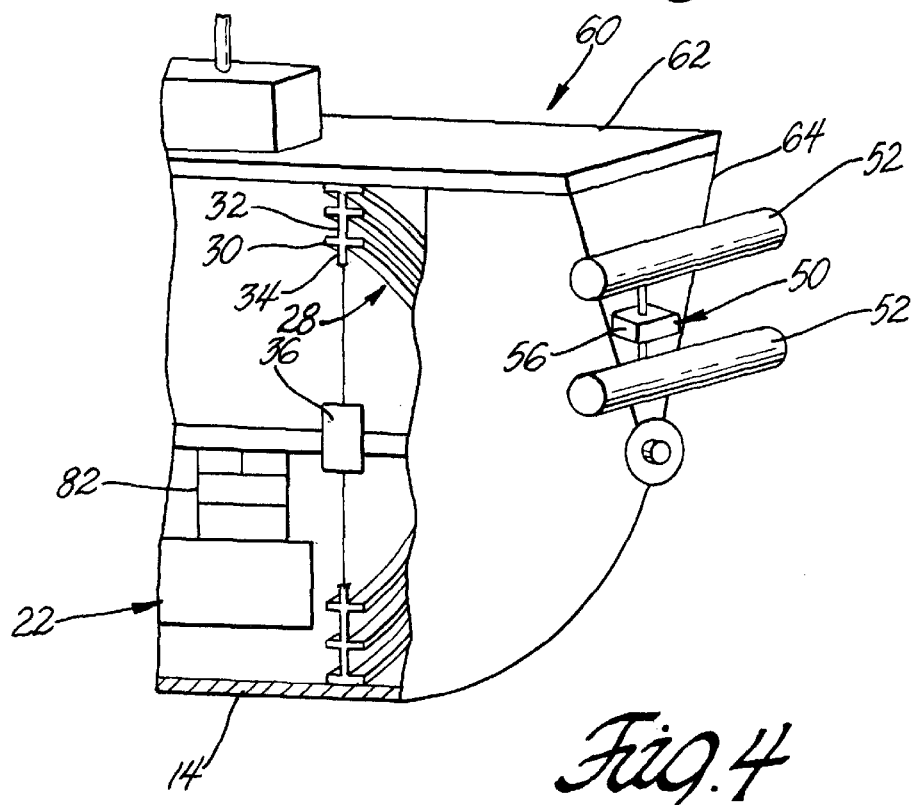
FIG. 4 is partial perspective view of the embodiment of FIG. 1.
Figure 2:
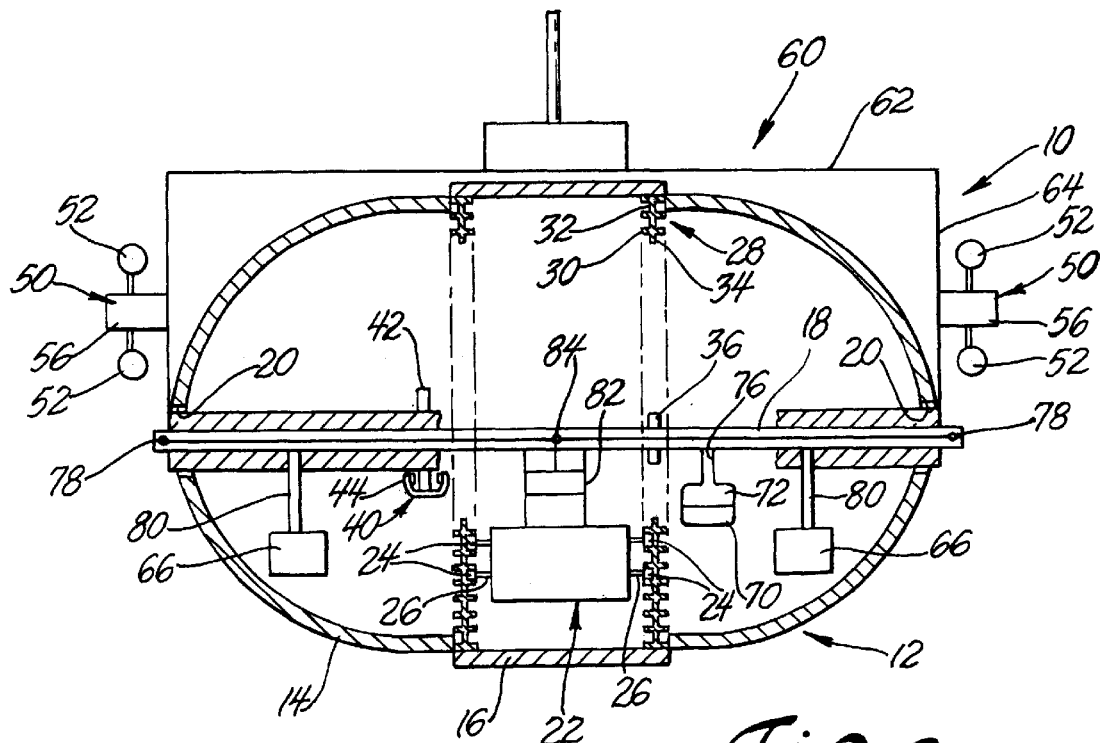
FIG. 2 is front view in partial section of the embodiment of FIG. 1.
Figure 3:
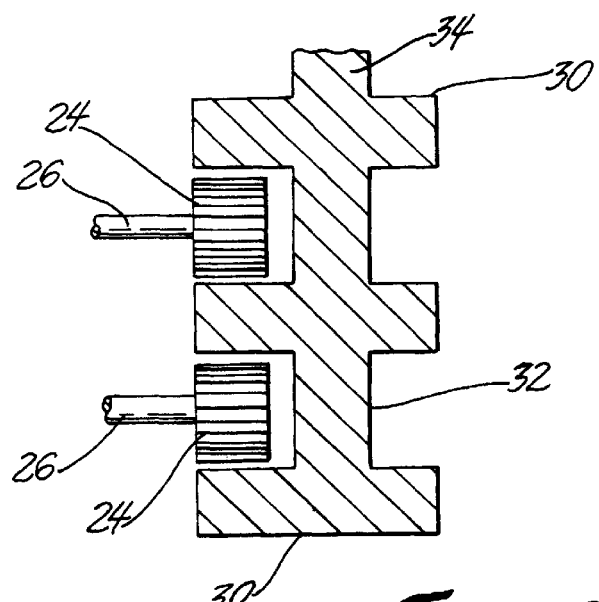
FIG. 3 is an enlarged view of a portion of a driving gear of FIG. 2.

The prime mover 22 is shown connected to an internal spur gear that serves as a transmission. The transmission has a plurality of first drive gears 24, mounted on shafts 26 powered by the prime mover 22, the gears is engaging a second set of larger, internally toothed gears designated generally 28 the combination forming an internal spur gear drive mechanism. As shown enlarged in FIG. 3, the internally toothed gears 28 are composed of two toothed gear tracks formed as flanges 30, the flanges being coaxially aligned with the axle 18 and extending from a center web 32 between the tracks. The innermost toothed flange 30 closest to axle 18, is connected to a plurality of radially extending spokes 34, at a first end of each spoke. The second end of each spoke is connected to an associated hub bearing 36 mounted on the axle 18, as shown best in FIG. 4. The drive gears 24 and associated shafts 26 act as a supporting framework to position the power pack between the larger internally toothed gears 28.

The larger, internally toothed gear 28 of the power transmission is connected to the continuous circumferential track 16. Thus, as the prime mover 22 rotates shafts 26, and the spur gears 24, the center of gravity of the prime mover 22 will tend to rise causing the internally toothed gear 28 to revolve so as to bring the prime mover's center of gravity back to it's lowest position. The internally toothed gear 28 rotation in turn causes the circumferential track 16 and the associated housing domes 14 to rotate moving the entire vehicle in the desired direction.

In addition to the drive system detailed above, a compressed gas steering system, powered by the prime mover, is provided for tight turns and finer rotational control of the robotic vehicle 10. The compressed gas steering system includes a compressor 70 and gas storage tank 72 with a control system 76 provided to maintain the gas storage tank 72 at the desired pressure and ready for use. The gas storage tank 72 is in turn fluidly connected to a pair of jet nozzles 78 located on the ends of axle 18. The fluid connection between the gas storage tank and jet nozzles is controlled by various sensors and valves so as to maintain the desired fluid pressure under normal operating conditions. The system will allow the flow of gas to the jet nozzles when it is desired to cause the robotic vehicle to rotate rapidly about its vertical axis in order to bring the weapons system into alignment or move the robot vehicle about an obstacle.

Frequently, it would be desirable to have the robotic vehicle remain firmly in position to remain on watch status and not consume more minimal amounts of energy. In order to maintain a fixed position, brakes 40 are provided, one example of a suitable brake set being the common caliper type disc brakes. Such a structure with a rotor 42 being attached to the axle 18 being engaged by a caliper 44 mounted on internally toothed gear 28. The brakes 40 could be responsive either to sensors located on the robotic vehicle or applied from a remote location. When the brakes 40 are engaged, the robotic vehicle could maintain a position even on inclines that would normally cause the vehicle to move downward. Also, the brakes can be engaged in order to hold the robotic vehicle in position when it is desired to activate a weapons system which will normally cause recoil forces tending to force the vehicle backwards.

The robotic vehicle 10 system has a platform 60 with a rectangular plate 62 located generally above the elliptical housing 14 with respect to the ground on which the robotic vehicle 10 is moving. The platform 60 is connected to the robotic vehicle 10 and mounted on a pair of support arms 64 that extend upward from the axle 18 at a slight angle to vertical forming a V.

The vehicle has a pair of counterweights 66 attached to the axle 18 within the housing 12 to provide counterbalancing forces and maintain the platform 60 above the housing 12. The counterweights 66 have as their primary function maintaining the platform 60 and its supports in position relative to the elliptical housing 12 so that the sensors and associated platform are always located above the housing. As noted before the counterweights 66 provide the primary means for holding the weapons platform in an upright position above the elliptical housing 12. However, the counterweights 66 of this invention have other uses. The counterweights 66 are reservoirs which are suspended from the axle 18 by means of a fluid connection 80 that is in turn connected to a fluid control system 82 that operates a valve 84 between the counterweights. A portion of the counterweights 66 total mass is a liquid that can be moved between the counterweights in response to signals either from the onboard sensors or from a remote controller. Moving fluid from one counterweight 66 to the other will redistribute the balance of the elliptical housing 12 and cause it to turn towards the counterweight having the greater mass.

In addition to providing a weight distribution and steering capacity, the counterweight reservoirs can provide a protected environment in which a portion of the electronic systems, such as computer control and other electronic measurement devices can be stored. The presence of liquid will provide a certain degree of cooling to the electrical systems enhancing their effectiveness and longevity.

As shown, the robotic vehicle 10 has a weapons system 50 journaled on the axle 18. The weapons system 50 shown comprises four pods 52 suitable for launching rockets or similar munitions. The pods 50 are rotatably mounted on the upright supports 64 of the weapons platform 60 and have an associated positioning motor 56 to rotate the pods 50 to position the pods for firing. The positioning can be done using either onboard sensors and targeting algorithms or manually aimed from a remote controller.

Various alterations and modifications will become apparent to those skilled in the art without departing from the scope and spirit of this invention and it is understood this invention is limited only by the following claims.

What is claimed is:

1. A robotic weapons platform comprising:

an elliptical housing, the housing having a major and minor axis, the elliptical housing being disposed so as to rotate about its major axis;

a continuous circumferential track disposed about a midsection of the elliptical housing coaxial with the major axis of the elliptical housing, the circumferential track having a ground gripping texture on its outer surface;

an axle located on the major axis of the elliptical housing, the axle being journaled with the housing to allow the housing and axle to rotate freely with respect to each other;

a prime mover for furnishing power to move the elliptical housing and operate all ancillary functions of the system, the prime mover being suspended from the axle to a position below the axle with respect to the ground;

a power transmission system having a first, drive gear powered by the prime mover, and a second larger, internally toothed gear engaging the teeth of the drive gear to form an internal spur gear drive;

a compressed gas steering system located within the housing, the compressed gas system having a compressor powered by the prime mover, the compressor being fluidly connected to a gas storage tank with a gas delivery system fluidly connected to the gas storage tank, the system having valving which controls the flow of gas to a pair of jet nozzles located on both ends of the axle, the nozzles being moveable to direct a jet flows so as to provide steering function to the elliptical housing;

braking members associated with the axle, the braking members being engageable in response to operator commands to hold the elliptical housing stable;

a weapons system journaled on the axle, the weapons system having a platform located above the elliptical housing with respect to the ground, the platform supporting sensing means capable of determining the terrain and locating possible military targets within a range of the robot;

a targeting sensor for locating and ranging a military target; weapons pods mounted on the ends of the axle, the weapons pods having an associated positioning motor that can rotate the weapons pod about the axis of the axle to the desired orientation;

counterweight shells attached to the weapons system on a side of the axle opposite the weapons platform, the counterweight shells being adapted to carry at least a portion of the electronic systems required by the robot, and further having a quantity of liquid therein to provide adjustable ballast counterweights;

a liquid movement system including a pump and valves responsive to signals from control means to move liquid between the counterweight shells so as to change the balance of the elliptical housing and thereby the direction of travel of the robot.

\* \* \* \* \*